No. 720,449. PATENTED FEB. 10, 1903.
W. G. LITTLE.
FISH HOOK.
APPLICATION FILED FEB. 7, 1902.
NO MODEL.
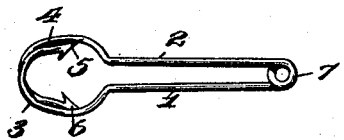
Inventor
William George Little.
Witnesses
L. G. Handy
A. B. Williams
By
Mason Fenwick Lawrence
his Attorneys

UNITED STATES PATENT OFFICE.

WILLIAM GEORGE LITTLE, OF DULUTH, MINNESOTA.

FISH-HOOK.

SPECIFICATION forming part of Letters Patent No. 720,449, dated February 10, 1903.

Application filed February 7, 1902. Serial No. 93,079. (No model.)

*To all whom it may concern:*

Be it known that I, WILLIAM GEORGE LITTLE, a citizen of the United States, residing at Duluth, in the county of St. Louis and State of Minnesota, have invented certain new and useful Improvements in Fish-Hooks; and I do hereby declare the following to be a full, clear, and exact description of the invention, such as will enable others skilled in the art to which it appertains to make and use the same.

This invention relates to fish-hooks, and has for its object to provide a fish-hook of small and economical construction which will not be liable to be hung in snags or weeds and which will invariably enter the flesh of the fish when once taken into the mouth, thus obviating much inconvenience due to loss or breakage of hooks by snagging and loss of bait or loss of the fish by failure of the hook to properly catch even after having been taken into the mouth of the fish.

With this object in view the invention consists, primarily, in a fish-hook formed of a single piece of wire doubled upon itself, so as to form a loop centrally of the said wire, the two shanks or arms thus formed extending parallel to each other the greater part of their distance, the lower portions of said shanks being bowed or bent outwardly and then turned or curved backward, the points of the hooks being formed at the extremity of this backwardly-turned portion. The points of the hooks being turned inwardly are normally held yieldingly in position, whereby the points are protected against snagging, the arrangement of the article being such that the point of one hook will project beyond the body of its mate when the shanks are pressed together or toward each other in any manner.

The invention further consists in a fish-hook of the specific improved construction and arrangement of parts hereinafter fully described and afterward specifically claimed.

In the drawing, which illustrates an example of the embodiment of my invention, the figure is a view of a fish-hook embodying my improvements.

Like numerals mark the same parts wherever shown in the drawing.

Referring to the drawing by numerals, 1 and 2 indicate the shanks, 3 and 4 the bows or bends, and 5 and 6 the points, of two fish-hooks of substantially the same construction as those ordinarily used. The shanks 1 and 2 are yieldingly or elastically connected at their upper ends—as, for instance, by means of a spring coil or bend 7, which may be attached to the shanks in any desirable manner or may, as shown, form integral parts of the wire of the hooks. It will be observed on reference to the drawing that the shanks are uncrossed and normally parallel, or substantially so. It will also be seen that the normal position or position of rest of the double hook is such that the sharp puncturing-points are slightly within the line of the shank of the opposite hook, whereby when the hook is dragged or trailed along the bottom or through weeds or over snags there will be a minimum tendency to the engagement of the points with obstructions on the bottom in the shape of snags of various kinds or with the weeds through which the hook is being drawn. The hooks will retain this normal position until they pass into the mouth of the fish; but when the mouth of the fish is closed upon the opposite hooks the point of each hook will be pressed outward beyond the shank of the other and will thus insure its engagement with the fish and when engaged is much more difficult for the fish to disengage than in the usual forms of hooks, as the backs of the hooks will tend to butt against each other and continue the engagement.

If desired, blades may be fixed in any suitable manner to the shafts of the hooks to cause the revolution thereof in trolling through the water. When bait is used, it may be fixed upon either one or both of the shanks in any suitable manner which will not block the passage of the hooks to their engaging position.

Any of the various accessories ordinarily used on single hooks, such as swivels or spoons, may be used with equal facility on my improved hook, if so desired, and may be placed in position either upon the hooks or intermediate the top of the shank and the end of the main line.

The advantages attending the use of my invention will be obvious, and I desire it to be understood that changes or variations may be made in the specific construction, as long as the construction is such as to perform the results, without departing from the spirit or scope of my invention.

Of course I am aware of the fact that it has hitherto been proposed to construct a spring fish-hook of my general character; but I believe myself to be the first to have devised a hook substantially as described, wherein the bent and hook portions are so formed relative to the shank portions of said hook that the the fish-bait may be applied to the same and the hook sprung or operated without the possibility of failure, owing to the position of the bait upon said hook.

It will be observed by reference to the drawing and the above description that a hook construction substantially as I have shown and claimed—that is, one comprising two substantially parallel shanks bowed or bent apart at a point of the lower portions thereof, then bent or turned backwardly, thus forming a double bow, with the points at the extremities thereof—presents many advantages over the ordinary shank-hook. This structure permits a relatively large piece of bait to be used, so as to entirely cover the hook, and avoids the possibility of the bait preventing the hooks springing properly.

Having thus fully described my invention, what I claim as new, and desire to secure by Letters Patent, is—

A fish-hook of the class described, comprising in its construction two simple hooks, each having a shank, bends and a point, a coiled or spiral spring connecting the upper ends of the shanks, exerting pressure in such a manner that the hooks are normally held in substantially the same curve and at points intermediate the bends of said shank portions, but are forced upwardly when the shanks are compressed, substantially as described.

In testimony whereof I hereunto affix my signature in presence of two witnesses.

WILLIAM GEORGE LITTLE.

Witnesses:
JAMES T. WATSON,
S. H. ECKMAN.